(12) United States Patent
Sussmeier et al.

(10) Patent No.: US 7,715,045 B2
(45) Date of Patent: May 11, 2010

(54) SYSTEM AND METHODS FOR COMPARING DOCUMENTS

(75) Inventors: John W. Sussmeier, Cold Spring, NY (US); Robert A. Cordery, Danbury, CT (US); Andrei Obrea, Seymour, CT (US); Frederick W. Ryan, Jr., Oxford, CT (US); Easwaran Nambudiri, Rye Brook, NY (US); Benjamin D. Singer, Chicago, IL (US)

(73) Assignee: Pitney Bowes Inc., Stamford, CT (US)

( * ) Notice: Subject to any disclaimer, the term of this patent is extended or adjusted under 35 U.S.C. 154(b) by 790 days.

(21) Appl. No.: 11/590,545

(22) Filed: Oct. 31, 2006

(65) Prior Publication Data

US 2008/0144055 A1 Jun. 19, 2008

(51) Int. Cl.
 *G06F 15/00* (2006.01)
(52) U.S. Cl. .................. 358/1.9; 358/405; 382/309
(58) Field of Classification Search .................. 358/1.1, 358/1.9, 1.14, 1.18, 405, 474; 382/278, 309
 See application file for complete search history.

(56) References Cited

U.S. PATENT DOCUMENTS

| | | | |
|---|---|---|---|
| 5,625,721 A * | 4/1997 | Lopresti et al. | ............. 382/309 |
| 7,438,231 B2 | 10/2008 | Cordery et al. | |
| 7,446,891 B2 | 11/2008 | Haas et al. | |
| 2005/0105824 A1* | 5/2005 | Kesal et al. | .................. 382/278 |
| 2005/0111027 A1 | 5/2005 | Cordery et al. | |
| 2005/0114667 A1 | 5/2005 | Haas | |
| 2006/0020802 A1 | 1/2006 | Haas et al. | |
| 2006/0126094 A1 | 6/2006 | Haas | |
| 2007/0076239 A1 | 4/2007 | Haas et al. | |
| 2007/0076948 A1 | 4/2007 | Haas et al. | |
| 2007/0143158 A1 | 6/2007 | Cordery et al. | |
| 2008/0144116 A1 | 6/2008 | Pauly et al. | |
| 2008/0144129 A1 | 6/2008 | Cordery et al. | |
| 2008/0158588 A1 | 7/2008 | Haas et al. | |

OTHER PUBLICATIONS

Huttenlocher, D. P., et al., Comparing images using the Hausdorff distance, IEEE Transactions on In Pattern Analysis and Machine Intelligence, vol. 15, No. 9. (1993), pp. 850-863.

* cited by examiner

*Primary Examiner*—Thomas D Lee
(74) *Attorney, Agent, or Firm*—George M. Macdonald; Angelo N. Chaclas

(57) ABSTRACT

A method includes scanning a page of a paper document to generate a first digital page image. The method further includes obtaining a second digital page image which corresponds to a second page. The method also includes comparing the first digital page image pixel-by-pixel with the second digital page image to generate a score that indicates a degree to which the first digital page image differs from the second digital page image.

11 Claims, 3 Drawing Sheets

SYSTEM AND METHODS FOR COMPARING DOCUMENTS

BACKGROUND

This invention is concerned with providing an automatic comparison of two documents.

When two documents are in the form of electronic text files, they can be compared quite readily by a standard function in conventional word processing programs such as Microsoft Word. However, when both documents are paper hard copies, or one is on paper and the other is an electronic text file, the task of comparing the documents becomes much more difficult. Particular challenges are presented, for example, in the case of verifying that two purported copies of a paper legal document (e.g., a lengthy contract) are in fact identical in text. Conventional practices call for one human being to orally read out from one purported copy, while another human being follows along on the other purported copy. Even when the two individuals are highly skilled paralegals, such a process may be time-consuming, tedious, and prone to error.

Another technique used to compare paper documents entails running both through an optical character recognition (OCR) scan. The two resulting electronic text files may then be compared as if both had been generated from a word processing program. Similarly, if one document is on paper and the other is an electronic text file, the paper document may be OCR scanned to provide a second electronic text file for character-by-character comparison with the text file that was available initially. However, OCR scanning can produce artifacts and discrepancies even where the two paper documents were identical (or where a paper document was printed from the text file to which it is to be compared), so that human review or "clean up" may be required. Also, character-by-character comparison may be impractical as to non-text portions of a document, such as graphs, charts and/or diagrams.

SUMMARY

According to an aspect of the invention, a method includes scanning a page of a paper document to generate a first digital page image. The first digital page image is formed of first pixels. The method further includes obtaining a second digital page image which corresponds to a second page. The second digital page image is formed of second pixels. The method also includes comparing the first digital page image pixel-by-pixel with the second digital page image to generate a score that indicates a degree to which the first digital page image differs from the second digital page image.

The obtaining of the second digital page image may include scanning a page of a paper document different from the paper document mentioned in the previous paragraph, to generate the second digital page image. Alternatively, the second digital page image may be obtained by software conversion of an electronic text file such as a Microsoft Word document into a digital image file such as a "tiff" file or a "pdf" image file. As used herein and in the appended claims, an "electronic text file" is an electronic file that includes codes that represent text characters. Such a file may also incorporate non-text elements such as format instructions, images, tables, charts, graphs, etc.

Before the two digital page images are compared, either or both may be subjected to a deskewing algorithm. The offset and scale of one of the files may be adjusted to match the offset and scale of the other file.

Another process that may be performed prior to comparing the files is a brightness normalization. For example, the pixel values of the first file may be summed, the pixel values of the second file may be summed, and the resulting sums may be compared (e.g., divided), with the resulting quotient applied as a pixel value scaling factor to each pixel value in one of the files.

In another aspect of the invention, a method includes scanning all pages of a multipage paper document to generate a first plurality of digital page images. Each of the digital page images is formed of pixels. The method further includes obtaining a second plurality of digital page images which corresponds to a multipage document to be compared with the multipage paper document. Each of the digital page images of the second plurality is formed of pixels. In addition the method includes comparing each page of the first plurality, pixel-by-pixel, with a respective corresponding page of the second plurality to generate for the page in question a respective score to indicate a degree to which the page in question differs from the respective corresponding page.

A page of one document "corresponds" to a page of another document if both pages occupy the same position in the respective documents. For example, the first page of one document corresponds to the first page of the other document, the second page of the first document mentioned corresponds to the second page of the other document, and so forth.

The second plurality of digital page images may be obtained by scanning a multipage paper document or by converting an electronic text file to digital page images. Deskewing, scaling and offsetting (as well as brightness normalization) may be performed with respect to one or both of the pluralities of digital page images before the page-by-page, pixel-by-pixel comparisons are made.

The difference (or "sameness") score for one page may be compared with the score or scores for another page or pages. For example, such a comparison of scores may highlight a page which has different text from its corresponding page in another document.

Respective electronic text files for the two documents may also be compared, character-by-character, for example, when the score or scores for the individual pages suggest that the two documents may not be identical. Alternatively, text file comparison may come first, to be followed by pixel-by-pixel comparison of the digital page images.

Individual lines of text in one document may be compared pixel-by-pixel with corresponding lines in the other document to obtain per line sameness/difference scores. That is, in another aspect of the invention, a method includes scanning a page of a paper document to generate a first digital page image. The first digital page image is formed of first pixels which represent lines of text and a background. The method further includes obtaining a second digital page image which corresponds to a second page. The second digital page image is formed of second pixels which represent lines of text and a background. In addition, the method includes comparing a line of text from the first digital page image with a corresponding line of text from the second digital page image to generate a score that indicates a degree to which the line of text from the first digital page image differs from the line of text from the second digital page image.

Again, a line of text in one page "corresponds" to a line of text of another page if both lines occupy the same position in the respective pages. For example, the first line of text of one page corresponds to the first line of text of the other page, the second line of text of the first page mentioned corresponds to the second line of text of the other page, and so forth.

As before, the second digital page image may be obtained by scanning a paper document or by converting an electronic text file to a digital page image.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention, in certain of its aspects, may provide an improved technique for comparing lengthy paper documents such as contracts. Digital images are obtained by scanning the two documents, and a pixel-by-pixel comparison is performed of the resulting digital image to provide per page "sameness" scores. The comparison may follow pre-processing of one or both images to improve the accuracy of the comparison. The technique may also be adapted to compare a paper document with an electronic text file by scanning the paper document, converting the text file to a digital image file, and comparing the two digital image files.

Figure 1:
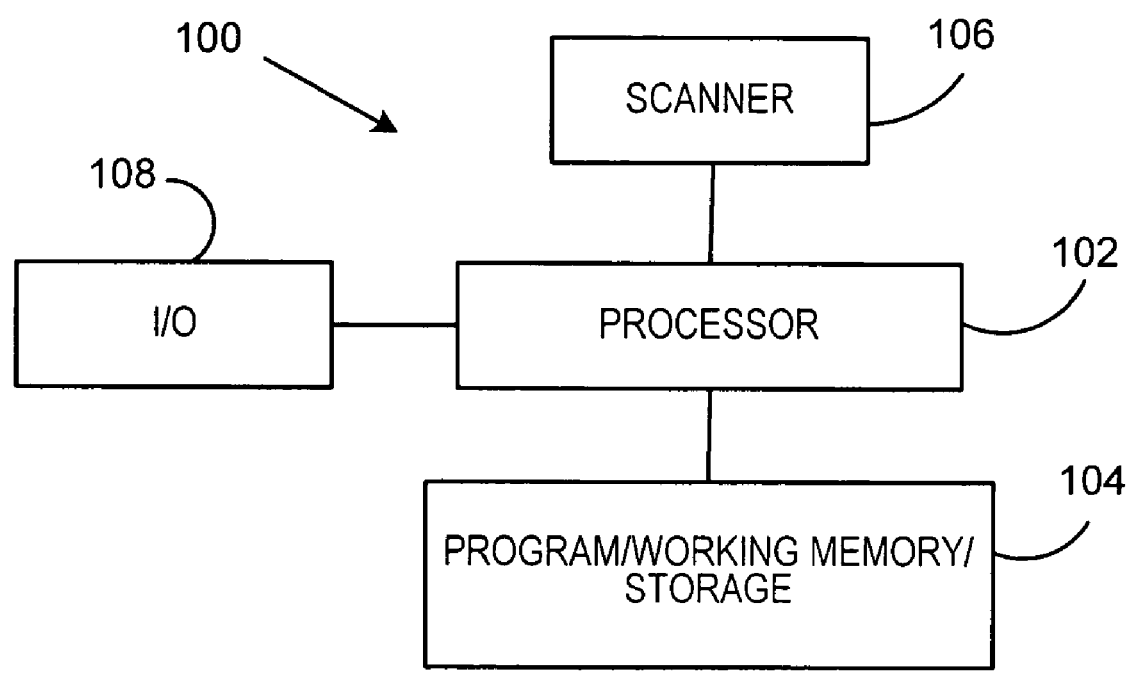
FIG. 1 is a simplified block diagram of a computer system which is provided according to aspects of the present invention.

FIG. 1 is a simplified block diagram of a computer system 100 provided in accordance with aspects of the invention. The computer system 100 may be entirely conventional in its hardware aspects, but may include and be controlled by software to provide functionality as described below to implement teachings hereof. In particular the hardware of the computer system 100, and a portion of the software, may be such as is provided for a conventional personal computer that includes a document scanner.

The computer system 100 includes a processor 102, which in practice may be constituted by one or more conventional microprocessors. The computer system 100 also includes one or more memory/storage devices (represented by block 104) which are in communication with the processor 102. For example, the memory/storage device(s) 104 may include read only memory (ROM), random access memory (RAM), flash memory, one or more hard disk drives, drives for one or more removable disk-shaped storage media, etc., none of which is shown separately from block 104. The memory/storage device(s) may function as both program and working memory and may store various software programs, including for example an operating system, a driver for a scanner (to be discussed below), a word processing application such as Microsoft Word, an application for converting word processing text files into digital images, and an application to provide the functionality described in connection with the flow charts included herein.

Further, the computer system 100 includes a scanner 106 which is in communication with the processor 102. As will be seen, the scanner 106 may operate to capture images of documents to be compared to other documents by the computer system 100 in accordance with aspects of the invention. The scanner 106 itself may be entirely conventional, and may for example have a resolution of 600 dpi (dots per inch) or 1200 dpi. In some embodiments, a scanner having higher resolution may be used. In some embodiments, the scanner 106 may not be a direct peripheral device in the computer system 100, but rather may be connected to the computer system by a data network (not shown). In some embodiments, the scanner 106 may be part of a larger device, such as a copier/printer.

In addition, the computer system may include other customary input/output devices, which may be in communication with the processor 102 and which are represented by block 108 in the drawing. For example, the other input/output devices may include a keyboard, a mouse, a display device, and a printer, none of which are shown in the drawing.

Figure 2:
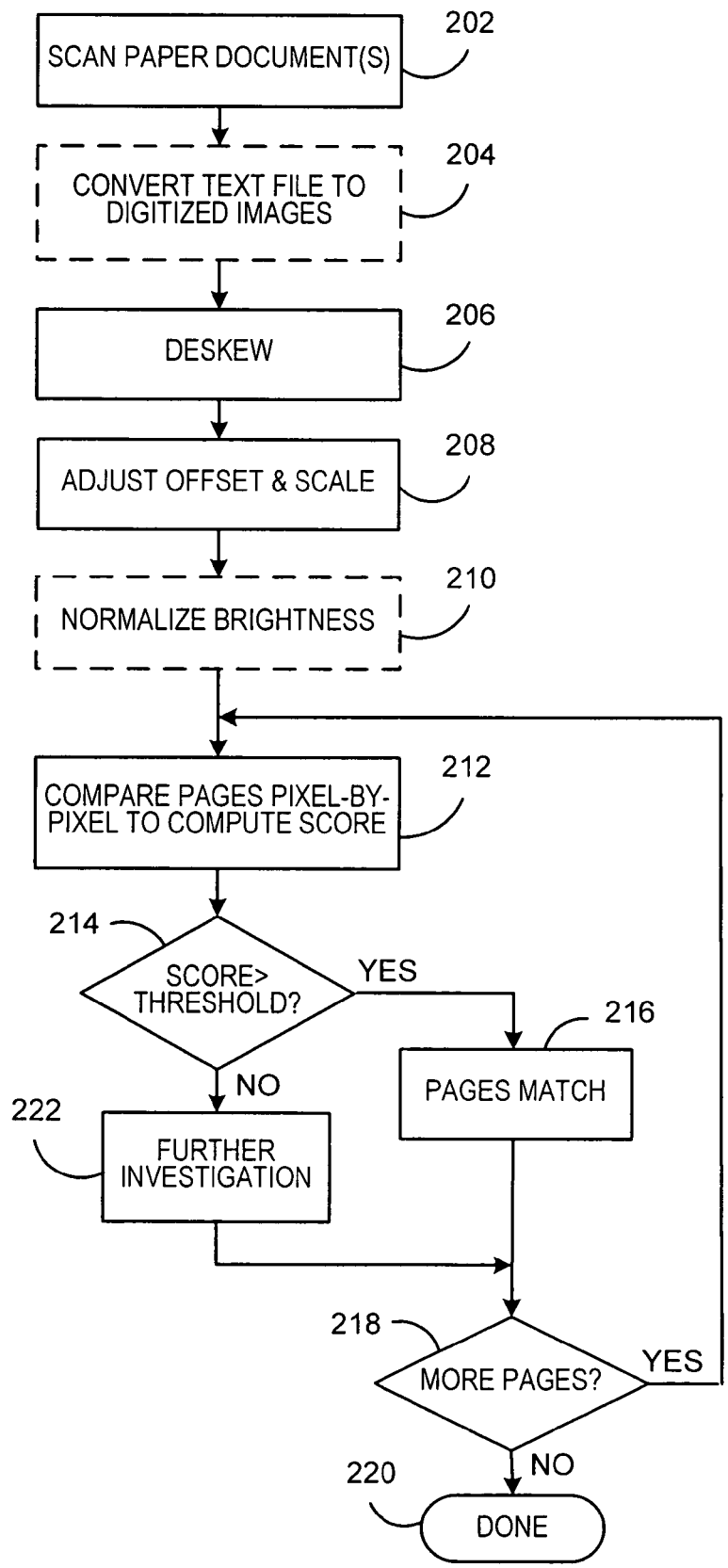
FIG. 2 is a flow chart that illustrates a process performed by the computer system of FIG. 1 according to aspects of the present invention.

FIG. 2 is a flow chart that illustrates a process performed by, or at least partially with, the computer system 100 according to aspects of the present invention.

At 202 in FIG. 2, a paper document to be compared to another document is scanned, using the scanner 106, and the resulting digital page images are stored in the memory/storage device(s) 104. If the document that was scanned is to be compared with another paper document, then the second paper document is also scanned at 202, and again the resulting digital page images are stored as a digital image file in the memory/storage device(s) 104. If the document that was scanned is to be compared against a document that is stored in the form of an electronic text file (e.g., a Microsoft Word file), then a step 204 (indicated in phantom in FIG. 2) may also be performed. At step 204 the electronic text file is converted to a digital image file. This may be done using conventional software stored in the computer system 100.

At 206, a deskew algorithm is applied by the computer system 100 to one or both of the digital image files. In the deskew algorithm, which may be performed in accordance with conventional principles, each digital page image of the digital image file is modified as required so that the lines of text in the digital page image are made parallel to the top and bottom edges of the digital page image. For example, the deskew algorithm may seek a cluster of text or graphics in the digital page image, and then may compute the angle of white space between subsequent lines or features. Then the deskew algorithm reorients the content of the digital page image so that the white space angle remaps to zero degrees.

At 208, an offset and scale algorithm is applied to each digital page image of one digital image file, so that the digital page image in question matches the offset and scale of the corresponding digital page image in the other digital image file. The offset is the distance between the left edge of the digital page image and the left edge of the lines of text on the digital page image. Thus, in effect, the text and other contents of one digital page image are shifted so that the left-hand margin of the digital page image matches the left-hand margin of the corresponding digital page image in the other digital image file. In addition, the size of the content of the digital page image is adjusted (scaled) so that the overall height (e.g., top of first line of text to bottom of last line of text) of the contents of the first digital page image is caused to match the overall height of the corresponding digital page image of the other digital image file.

The pixels which make up each digital page image of each digital image file may be binary (i.e., may have values of "0" and "1" only, with "0" signifying a white pixel and "1" signifying a black pixel, for example), or may alternatively represent gray scale values (e.g., an 8-bit integer with "0" representing white and "255" representing black, with other values in between representing shades of gray). If the pixels represent gray scale values, then a brightness normalization algorithm may be applied to normalize the brightness level of one digital image file to the brightness level of the other digital image file. This step is indicated in phantom at 210.

Figure 3:
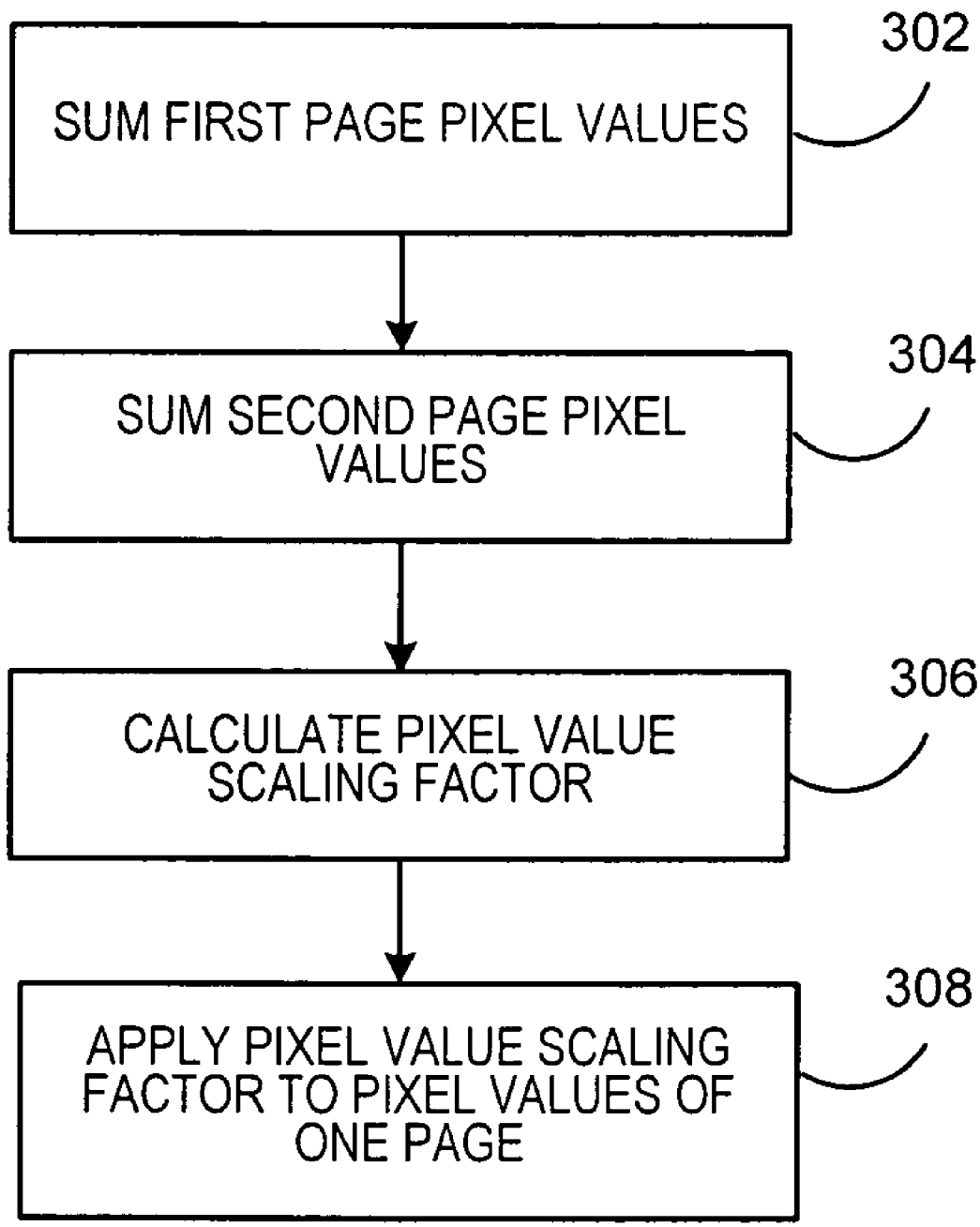
FIG. 3 is a flow chart that illustrates some details of the process of FIG. 2.

Details of an example brightness normalization algorithm are illustrated in FIG. 3. At 302 in FIG. 3, the values of all of the pixels of a digital page image in one digital image file are summed to produce a first sum. At 304 in FIG. 3, the values of all of the pixels of the corresponding digital page image in the other digital image file are summed to produce a second sum. At 306 in FIG. 3, the ratio of the second sum to the first sum is calculated. This ratio may be used as a pixel value scaling factor, and may be applied (e.g., by multiplication) to each pixel value of the first digital page image, as indicated at 308 in FIG. 3.

Referring again to FIG. 2, once the deskew, offset and scale adjustment and brightness normalization (if needed) operations are performed, the process of FIG. 2 may continue with a pixel-by-pixel comparison of a digital page image of one digital image file to the corresponding digital page image of the other digital image file, as indicated at 212 in FIG. 2. It will be understood that the comparison may be performed by the computer system 100 and particularly by the processor 102 operating in conjunction with other components of the computer system 100. The purpose of the comparison is to calculate a score to indicate the degree of difference (also to be considered the degree of sameness) between the two digital page images. A number of different formulae may be used to calculate the difference score. For example, the following formula may be used:

$$X = 1 - \sum_{0}^{m} \frac{(Diff)}{m(2^n - 1)},$$ (Equation 1)

where:
X is the difference score;
(Diff) is the absolute difference between the value of the current pixel and the value of the corresponding pixel in the corresponding page of the other digital image file;
m is the total number of pixels in each of the digital page images being compared; and
n is the number of bits of gray scale resolution.

Where the pixel values are binary, n=1. If the comparison results in a score X=1, then perfect correlation between the two digital page images is indicated. If the comparison results in a score X=0, then perfect inverse correlation between the two digital page images is indicated. (It will be appreciated that, except for a blank page, a score of X=1 is unlikely. Similarly, a score of X=0 is also—even more—unlikely.)

In some embodiments, as discussed below, corresponding regions within the page images, such as each line of text, may be compared to generate a sameness score for each region. In some embodiments, if region-by-region comparison is made, the page in question may be given the lowest of all the respective sameness scores calculated for the regions.

At 214 it is determined whether the score X calculated for a particular page is higher than a threshold. If so, then the process results in a conclusion that the corresponding pages of the two documents are a match for each other, as indicated at 216. It is then determined at 218 whether more pages remain to be compared between the two documents. If so, the process loops back to 212 and the next page-to-page comparison if made. If not, the process ends (220).

Considering again the determination made at 214, if it is determined that the score obtained by comparing the two pages at 212 does not exceed the threshold, then further investigation may take place as indicated at 222. For example, comparative proofreading by one or two individual human beings may be performed with respect to the two pages. In addition or alternatively, an OCR process may be applied to the two pages, to be followed by a character-by-character comparison of the two resulting electronic text files. (Of course, if a text file was already available for one of the documents, it would not be necessary to perform OCR processing with respect to that document before making the character-by-character comparison between the two pages.) In addition or alternatively an image of the differences may be displayed for examination.

Following step 222, if performed, the process then advances to the above-discussed decision block 218, etc.

In addition to comparing the two documents page-by-page (and pixel-by-pixel within the page) to generate a sameness score relative to the two pages compared, or as an alternative, the two documents may be compared line-by-line, at least to some extent, to generate a sameness score for the respective corresponding lines of text in the two digital image files. For example, a line of text in one of the pages may be compared pixel-by-pixel with the corresponding line of text in the other page. In some embodiments, a line-by-line comparison may be made as part of the "further investigation" step 222 where the sameness score for the two pages failed to exceed the threshold. Line-by-line sameness scores may be generated for example where page-by-page sameness scores call into question the sameness of the two documents. Where relatively low page-by-page sameness scores are suspected to have been caused only by differences in pagination, lines may be compared to lines that correspond in position within the document as a whole, rather than based on corresponding position within corresponding pages.

In some embodiments, the computer system 100 may compare the various sameness scores for the pages and/or lines within the document to flag any page or line score or scores that are significantly lower than the other page or line scores. This may aid in locating particular pages and/or lines at which differences in text are present between the two documents.

The flow charts included herein and the accompanying description should not be understood to imply a fixed order of performing the indicated method steps. Rather, the method steps may be performed in any order that is practicable. For example, referring to FIG. 2, step 204, if performed, may be performed prior to step 202.

In some embodiments, a more complex formula than Equation 1 may be employed to calculate the difference score. For example, such a formula may compensate for nonlinearities in the printing and/or scanning of the two documents.

In some embodiments, two paper documents may first be OCR-scanned and compared character-by-character, and thereafter, if desirable, the two documents may be compared pixel-by-pixel, as described above, to confirm or overrule a result of the character-by-character comparison.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method comprising:

scanning a page of a paper document to generate a first digital page image, the first digital page image formed of first pixels;

obtaining a second digital page image which corresponds to a second page, the second digital page image formed of second pixels;

comparing the first digital page image pixel-by-pixel with the second digital page image to generate a score that indicates a degree to which the first digital page image differs from the second digital page image; and applying a brightness normalization algorithm which includes:

calculating a sum of values of the first pixels;
calculating a sum of values of the second pixels;
comparing said sums to generate a pixel value scaling factor; and
applying the pixel value scaling factor to all of the first pixels or to all of the second pixels;

said brightness normalization algorithm being applied before said comparing step.

2. The method according to claim 1, wherein:

the paper document is a first paper document; and the obtaining step includes scanning a page of a second paper document to generate the second digital page image.

3. The method according to claim 1, wherein the obtaining step includes converting an electronic text file to a digital image file.

4. The method according to claim 1, further comprising:

applying a deskew algorithm to at least one of said digital page images before said comparing step.

5. The method according to claim 4, further comprising:

applying a deskew algorithm to both of said digital page images before said comparing step.

6. The method according to claim 1, further comprising:

applying an offset and scale algorithm in which an offset and a scale of one of the digital page images are adjusted to match an offset and a scale of the other of the digital page images, said offset and scale algorithm applied before said comparing step.

7. A method comprising:

scanning all pages of a multipage paper document to generate a first plurality of digital page images, each of said digital page images formed of pixels;

obtaining a second plurality of digital page images which corresponds to a multipage document to be compared with said multipage paper document, each of said digital page images of said second plurality formed of pixels; and comparing each page of said first plurality, pixel-by-pixel, with a respective corresponding page of said second plurality to generate for said each page a respective score to indicate a degree to which said each page differs from said respective corresponding page, obtaining a first electronic text file which corresponds to said multipage paper document;

obtaining a second electronic text file which corresponds to said multipage document to be compared with said multipage paper document; and comparing said first electronic text file character-by-character with said second electronic text file.

8. The method according to claim 7, wherein:

the multipage paper document is a first multipage paper document; and the obtaining step includes scanning a second multipage paper document to generate the second plurality of digital page images.

9. The method according to claim 7, wherein the obtaining step includes converting an electronic text file to a digital image file.

10. The method according to claim 7, further comprising:

deskewing, scaling and offsetting at least one of said pluralities of digital page images before said comparing step.

11. The method according to claim 7, further comprising:

comparing one of said scores with at least one other of said scores.

* * * * *